May 14, 1935.  C. A. SUNDSTRAND  2,001,075
NUT CHOPPER
Filed Nov. 21, 1932
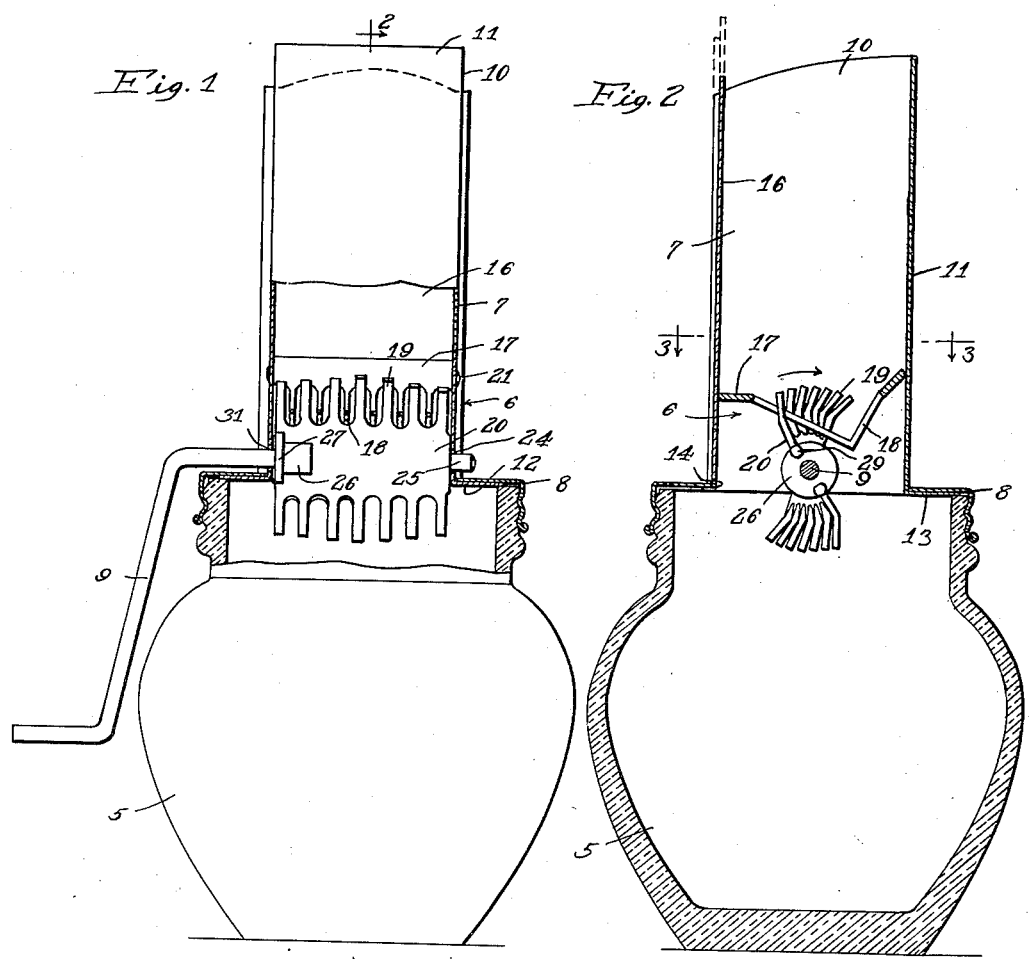
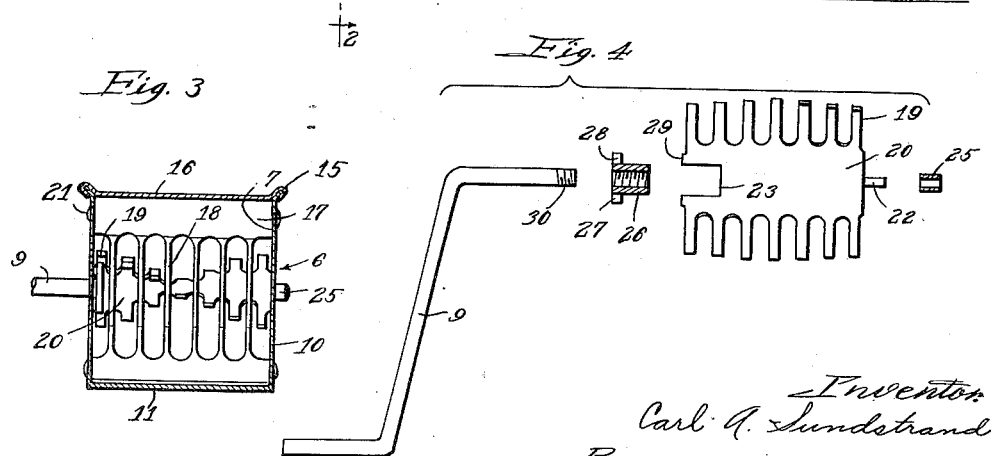
Inventor
Carl A. Sundstrand
By
Wilson, Dowell, McCanna & Rehm
Attys Patented May 14, 1935

2,001,075

UNITED STATES PATENT OFFICE 2,001,075

NUT CHOPPER

Carl A. Sundstrand, Rockford, Ill.

Application November 21, 1932, Serial No. 643,670

13 Claims. (Cl. 146—123)

This invention relates to a new and improved device for chopping or breaking up nut meats and other foodstuffs.

Despite all the ingenuity that has been exercised in the development of numerous articles of kitchenware, it appears that nothing practical has been developed for breaking nut meats, and as a result, this and other work of a like nature is still done to a large extent by hand. The work is not only tedious, but the results are unsatisfactory. The customary practice is to have the nuts in a chopping bowl and to keep working them with a knife or chopper until they are brought to the desired fineness. This, as stated before, is tedious work, and there is the objection that the stuff is not cut to any uniform size, some particles being cut very fine and others being left very coarse. Furthermore this old method was objectionable because of the loss of the natural oils and the consequent loss of flavor.

It is, therefore, the principal object of my invention to provide a device operable by the turning of a crank for ease in operation, and constructed to break the nut meats or other food to a fairly uniform size.

Another object consists in the provision of a device consisting of a hopper in the bottom of which the breaker means is embodied, arranged to be mounted on a jar by means of a screw-on cap, thus providing a relatively inexpensive device, attractive in appearance, and extremely practical for the purpose intended.

Other objects and advantages will appear in the course of the following detailed description, in which reference is made to the accompanying drawing, wherein—

Figure 1 is a view partly in front elevation and partly in central vertical section of a nut chopper made in accordance with my invention;

Fig. 2 is a section in the transverse plane indicated by line 2—2 in Figure 1;

Fig. 3 is a cross-section on the line 3—3 of Fig. 2, and

Fig. 4 is a view indicating how the rotating parts are arranged to be assembled together.

The same reference numerals are applied to corresponding parts throughout the views.

The device consists of a glass jar 5 adapted to receive the broken up foodstuff dropping from the breaker means, indicated generally by the numeral 6, provided in the lower end of a hopper 7, mounted on the jar as by means of a screw-on cap 8. The nuts or other foodstuff to be comminuted are placed in the hopper 7 and broken up by turning the crank 9. Manifestly, the jar 5 affords a good steady base for the device and can be held by one hand as the crank is turned with the other. The jar being of glass or other suitable translucent material permits the operator to observe what amount has been prepared, so that operation can be stopped at the right time and no food wasted.

The hopper 7 is suitably stamped from one piece of sheet metal to provide two side walls 10 joined by a back wall 11, the two side walls and the back wall also having outwardly projecting lugs 12 and 13 formed on the lower end thereof to rest on the rim of the jar. This permits clamping the hopper by means of the cap 8 which, as clearly appears, has a central opening 14 therein through which the hopper projects, the cap fitting down on top of the lugs 12 and 13 for the purpose of clamping the hopper and at the same time closing the mouth of the jar. The front edge of each of the side walls 10 is bent outwardly at an angle to form longitudinal flanges 15 on which the edges of a slide 16 are made to fit, as shown, to form a removable front wall for the hopper 7. The removal of this slide affords easy access to every bit of the interior of the hopper to facilitate cleaning.

The breaking or comminuting means 6 provided in the bottom of the hopper 7 consists preferably of a grate plate 17 stationarily mounted in the hopper and slotted transversely to provide a plurality of equally spaced parallel grate bars 18, between which the breaker prongs 19 of a rotary blade 20 are arranged to operate. The two parts mentioned are stamped from sheet metal for economy in construction. The plate 17 is bent to V cross-section so that the bars 18 form a crotch, and the prongs 19 of the blade 20 move through the crotch in the direction indicated by the arrow in Fig. 2. It should be clear from Fig. 2 how the nut meats or other material to be broken will always drop down into the crotch in front of the teeth 19, so as to be broken in the movement of the prongs between the bars forming said crotch. The plate 17 is supported on the side walls of the hopper by means of lugs 21 provided on the plate projecting through slots provided in the side walls of the hopper. The blade 20, as clearly appears in Fig. 2, is of helical form, whereby to make for smoother and easier operation with the hand crank, one radial prong at a time being passed through between the bars, instead of the entire set of prongs. The blade 20 is formed with a small axial prong 22 at one end and a notch 23 at the other end. The prong 22 is arranged to be passed through a hole 24 of larger diameter provided in one side wall of the hopper, whereupon a bushing 25 is pressed onto the prong to have a close working fit in the hole. In this way the bearing at this end of the blade is made as large as the one provided at the other end, as will soon appear. A small plug 26, having an annular flange 27 on one end, is entered in the notch 23 far enough so that the end of the blade enters diametrically opposed slots 28 provided in the flange 27. Small projections 29 on the end of the blade are then upset to fasten the plug in place. The end of the crank 9 is threaded as at 30 to thread into the plug. The thread is a right-hand thread, so that resistance to the turning of the blade by means of the crank serves only to tighten the connection between the blade and crank. A hole 31 is provided in the other side wall of the hopper in alignment with the hole 24, and the crank has a close working fit in this hole, as indicated.

It is evident from the foregoing description that I have provided a device of simple and economical construction and thoroughly practical for the purpose intended. It breaks nut meats and peanuts to the desired uniform size quickly and easily and without cutting or crushing the same and losing the oil present. That was the objection to using a meat grinder for this work. The present device has also been used to good advantage for chopping up olives, cherries, hard boiled eggs, tuna fish, and many other foods used for sandwich fillings and salads. After a batch of nut meats have been chopped, I have found it a good plan to use the device in sprinkling the cut up material, on a cake, for example. In doing that, the device is simply inverted and the crank turned to regulate the discharge of the prepared material through the hopper. The jar also serves as a container for storing chopped up nut meats. Any screw-on cap for a jar of the same size can be used to seal the jar.

I claim:

1. In a device of the class described arranged to be mounted on a suitable receptacle, a hopper formed from a single piece of sheet metal to provide spaced side walls and a back wall extending therebetween, a slide formed from another piece of sheet metal arranged to serve as the front wall of said hopper, the front edges of the side walls being bent to form flanges, and said slide having the lateral edges thereof formed to fit slidably on said flanges, a sheet metal plate disposed in the lower end of the hopper and suitably secured to the side walls thereof, whereby to hold the latter in a predetermined relation besides forming the bottom of the hopper, said plate being bent to V cross-section, the crotch portion of the V having a plurality of transverse slots provided therein in parallelism, whereby to provide a series of parallel breaker bars, and a blade rotatably mounted on the side walls of the hopper beneath the aforesaid plate, said blade having a plurality of breaker prongs projecting from the edge thereof and entered in the slots between the bars for cooperation with the latter in the breaking up of material placed in the hopper.

2. In a device of the class described, a hopper formed from a single piece of sheet metal to provide spaced side walls and a back wall extending therebetween, a slide formed from another piece of sheet metal arranged to serve as the front wall of said hopper, the front edges of the side walls being bent to form flanges, and said slide having the lateral edges thereof formed to fit slidably on said flanges, the lower ends of the back and side walls being bent outwardly to form supporting portions, a receptacle for chopped material having a mouth on which the supporting portions are adapted to rest, a cap for said receptacle fitting down over the hopper and engaging the top of the supporting portions whereby to clamp the hopper on the receptacle in the application of the cap, and chopping means provided in said hopper.

3. In a device of the class described, the combination of spaced supporting walls, a flat blade arranged to be supported between said walls and rotated, said blade being formed from a single piece of sheet metal formed to provide an axial prong on one end thereof, said prong being rotatably received in an opening provided therefor in one of said walls, the other end of said blade having a portion thereof cut away in axial alignment with said prong, a plug mounted in said cut-away portion in such a way as to serve to communicate rotation to the blade, the other supporting wall having an opening provided therein, and a crank having a portion received in said opening for bearing support and fixed in said plug whereby to communicate rotation to the blade.

4. A device as set forth in claim 3 wherein the prong is of a diameter approximately equal to the thickness of the sheet metal of said blade, the opening in the first mentioned wall being of larger diameter than the prong on the blade to provide an enlarged bearing, and the device including a bushing fixed on the prong and having a close working fit in said opening.

5. A device as set forth in claim 3 wherein said plug has an annular flange provided thereon on the outer end thereof, said flange having diametrically opposed slots provided therein to receive the end of the blade to communicate rotation from the plug to the blade in the turning of the crank.

6. A device as set forth in claim 3 wherein said plug has an annular flange provided thereon on the outer end thereof, said flange having diametrically opposed slots provided therein to receive the end of the blade to communicate rotation from the plug to the blade in the turning of the crank, said blade having the end thereof formed to project from said slots when the plug is entered to its full extent in the cut-away portion of the blade, the projecting portions being formed to permanently secure the plug on the blade.

7. A device as set forth in claim 3 wherein said plug has a flange portion provided on the outer end thereof, said flange having a slot provided therein receiving an end portion of the blade to communicate rotation from the plug to the blade in the turning of the crank.

8. A device as set forth in claim 3 wherein said plug has a flange portion provided on the outer end thereof, said flange having a slot provided therein receiving an end portion of the blade to communicate rotation from the plug to the blade in the turning of the crank, said blade having the end thereof formed to project therefrom when the plug is entered to its full extent in the cut-away portion of the blade, the projecting portion being formed to permanently secure the plug on the blade.

9. A device of the character described comprising a receptacle for chopped material having an open top portion, a sheet metal hopper generally rectangular in form disposed over said receptacle and having outwardly bent supporting portions on the lower ends of the walls thereof to rest on the top portion of said receptacle, a grate plate transversely disposed in the lower portion of the hopper and suitably secured to the walls thereof, whereby to provide lateral support for said walls internally, a closure cap for the receptacle having a rectangular opening provided therein receiving said hopper, whereby the cap provides lateral support for the walls of said hopper externally, said cap engaging the top of the supporting portions whereby to clamp the hopper thereby on the receptacle in the application of the cap to the latter, and chopping means in said hopper to cooperate with the grate plate to break up material placed in the hopper.

10. An invertible nut chopper or the like, arranged when inverted to serve as a dispenser of chopped material, said device comprising a jar to receive chopped material in the chopping thereof, a rectangular hopper disposed normally over the jar and having outwardly projecting bottom portions to engage on top of the rim of the jar, a closure cap for said jar having a rectangular opening provided therein receiving said hopper, the cap being superimposed on the outwardly projecting portions of the hopper to clamp the hopper rigidly on the jar in the application of the cap to the latter, and hand crank operated chopping means in the hopper arranged in the normal position of the device to chop material placed in the hopper and cause dropping thereof into the jar, said last mentioned means serving in the inverted position of the device to regulate discharge of chopped material from the jar through the hopper.

11. In a hand operable kitchen utensil of the character described, a small receptacle of glass or the like having an open top portion provided with an externally threaded neck of large diameter in relation to the diameter of the receptacle, a hopper of sheet metal generally rectangular in cross-section disposed over said receptacle and having outwardly projecting supporting portions on the lower ends of the walls thereof formed to rest flatly on top of the neck of said receptacle for sole support of the hopper thereon, a hand operable crank extending from one side of said hopper and operatively connected with a member to be turned thereby in the hopper and a circular internally threaded closure cap of sheet metal for closing said receptacle having threaded engagement with the neck on said receptacle and having a rectangular opening provided therein of a size in which said hopper is arranged to fit and through which said hopper projects, whereby to locate said hopper in a predetermined relation to the receptacle by means of said cap, said cap engaging the top of the supporting portions whereby to clamp the hopper thereby on the neck of said receptacle in the threaded application of the cap thereon.

12. In a hand operable kitchen utensil of the character described, a small receptacle of glass or the like having an open top portion provided with an externally threaded neck of large diameter in relation to the diameter of the receptacle, a hopper of sheet metal disposed over said receptacle and having outwardly projecting supporting portions on the lower ends of the walls thereof formed to rest flatly on top of the neck of said receptacle for sole support of the hopper thereon, a hand operable crank extending from one side of said hopper and operatively connected with a member to be turned thereby in the hopper and a circular internally threaded closure cap of sheet metal for closing said receptacle having threaded engagement with the neck on said receptacle and having an opening provided therein of a size in which said hopper is arranged to fit and through which said hopper projects, whereby to locate said hopper in a predetermined relation to the receptacle by means of said cap, said cap engaging the top of the supporting portions whereby to clamp the hopper thereby on the neck of said receptacle in the threaded application of the cap thereon.

13. An invertible kitchen utensil comprising a jar normally forming the base of the utensil and adapted to receive chopped material, a hopper normally disposed over the jar to receive material to be chopped and to discharge chopped material into the jar, a hand operable crank extending from one side of said hopper to rotate chopping means in the hopper, and a cap surrounding the hopper and applied to the jar to form a closure for the jar and a support for the hopper, said hopper in the inverted position forming a chute for discharge of chopped material from the jar, said hand crank operated means serving then to regulate the discharge of chopped material from the jar, and said cap serving then to support the hopper from the jar and to retain chopped material in the jar prior to its discharge through the hopper.

CARL A. SUNDSTRAND.